United States Patent
Prasad et al.

(10) Patent No.: US 7,889,808 B2
(45) Date of Patent: Feb. 15, 2011

(54) INTERPOLATION BASED QR DECOMPOSITION FOR MIMO-OFDM SYSTEMS USING D-SMC DEMODULATOR WITH PER CHUNK ORDERING

(75) Inventors: Narayan Prasad, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 739 days.

(21) Appl. No.: 11/857,251

(22) Filed: Sep. 18, 2007

(65) Prior Publication Data

US 2008/0069261 A1    Mar. 20, 2008

Related U.S. Application Data

(60) Provisional application No. 60/825,936, filed on Sep. 18, 2006.

(51) Int. Cl.
*H04L 1/02* (2006.01)
(52) U.S. Cl. .................................................. 375/267
(58) Field of Classification Search ................ 375/260, 375/267, 285, 295, 298, 316; 370/206, 208, 370/210
See application file for complete search history.

(56) References Cited

U.S. PATENT DOCUMENTS

| | | | |
|---|---|---|---|
| 7,110,349 B2 * | 9/2006 | Branlund et al. ............ 370/203 |
| 7,742,536 B2 * | 6/2010 | Burg et al. .................. 375/260 |
| 2007/0253476 A1 * | 11/2007 | Tirkkonen et al. .......... 375/230 |
| 2008/0025336 A1 * | 1/2008 | Cho et al. ................... 370/432 |
| 2008/0069261 A1 * | 3/2008 | Prasad et al. ................ 375/267 |

OTHER PUBLICATIONS

Agarwal, P. et al., "An enhanced deterministic sequential monte-carlo method for near optimal MIMO demodulation with QAM constellations", IEEE Trans. Signal Processing, Jun. 2007.

Cescato, D. et al., "Interpolation-based QR decomposition in MIMO-OFDM receivers", Proc. 6th IEEE Workshop on Signal Processing Advances in Wireless Communications, NY 2005.

Wubben, D. et al., "Interpolation-based Successive Interference Cancellation for Per-Antenna-Coded MIMO-OFDM Systems Using P-SQRD", Proc. ITG Workshop on Smart Antennas, Germany, Mar. 2006.

Wolniansky, P.W. et al., "V-BLAST: An architecture for realizing high data rates over the rich-scattering wireless channel", Proc. of the ISSSE, Italy, Sep. 1998.

* cited by examiner

*Primary Examiner*—Khanh C Tran
(74) *Attorney, Agent, or Firm*—James Bitetto; Joseph Kolodka

(57) ABSTRACT

In accordance with the invention, a method includes determining either the number of tones per chunk required to compute per-chunk order responsive to a sub-band bandwidth, a coherence bandwidth and number of chunks, or the number of chunks responsive to a sub-band bandwidth and a coherence bandwidth; determining an order for each chunk; and determining, for each chunk, QR decompositions for all its tones according to the determined order.

9 Claims, 3 Drawing Sheets

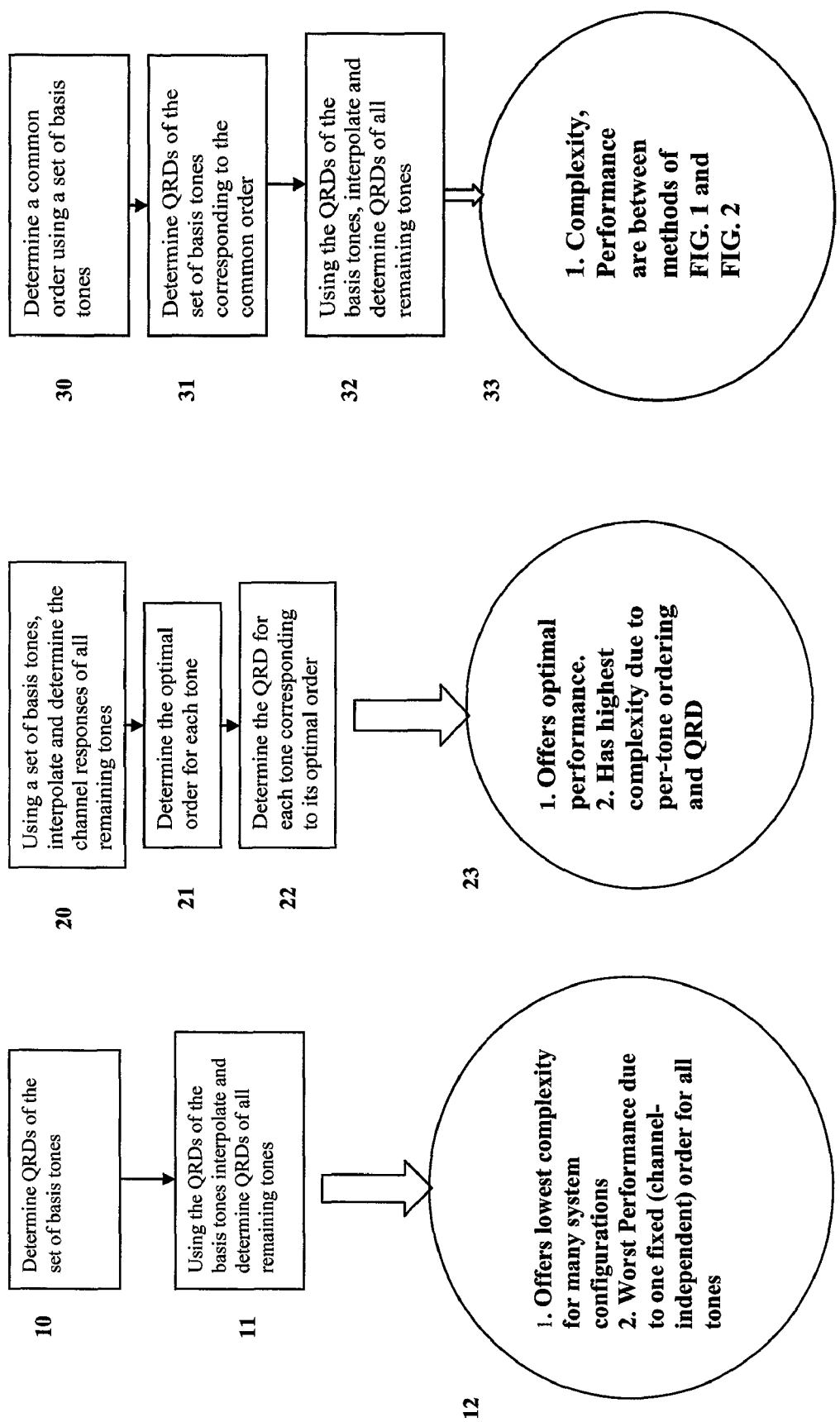

INTERPOLATION BASED QR DECOMPOSITION FOR MIMO-OFDM SYSTEMS USING D-SMC DEMODULATOR WITH PER CHUNK ORDERING

This application claims the benefit of U.S. Provisional Application No. 60/825,936, entitled "Interpolation Based QR Decomposition for MIMO-OFDM Systems Using D-SMC Demodulator with Per Chunk Ordering", filed on Sep. 18, 2006, the contents of which is incorporated by reference herein.

BACKGROUND OF THE INVENTION

The present invention relates generally to wideband MIMO-OFDM (Multiple-Input Multiple-Output Orthogonal Frequency Division Multiplexing) systems, and, more particularly, to a method: interpolation based QR decomposition in MIMO-OFDM systems using D-SMC (Deterministic-Sequential Monte Carlo) demodulator with per chunk ordering.

The following works by others are mentioned in the application and referred to by their associated reference:

[1] P. Agarwal, N. Prasad, X. Wang, and M. Madihian, "An enhanced deterministic sequential monte-carlo method for near optimal MIMO demodulation with QAM constellations," *IEEE Trans. Signal Processing.*, June 2007.

[2] D. Cescato, M. Borgmann, H. Bolcskei, J. Hansen, and A. Burg, "Interpolation-based QR decomposition in MIMO-OFDM receivers," in *Proc. 6th IEEE Workshop on Signal Processing Advances in Wireless Communications*, New York, N.Y., 2005.

[3] D. Wubben and K. D. Kammeyer, "Interpolation-based QR decomposition in MIMO-OFDM receivers," in *Proc. ITG Workshop on Smart Antennas*, Reisensburg, Ulm, Germany, March 2006.

[4] P. W. Wolniansky, G. J. Foschini, G. D. Golden, and R. A. Valenzuela, "V-BLAST: An architecture for realizing very high data rates over the rich-scattering wireless channel," in *Proc. of the ISSSE*, Pisa, Italy, September 1998, invited.

The deterministic sequential Monte-Carlo (D-SMC) demodulator is one of the most promising demodulators for multiple antenna systems over narrowband fading channels [1]. The extension of the MIMO D-SMC demodulator from the narrowband case to the wideband system based on OFDM requires the computation of QR decomposition for each of the data-tones. The number of data tones can range from 48 (as in IEEE 802.11a/g standards) to 6817 (as in the DVB-T Standard). Interpolation based QR decomposition algorithms were recently proposed in [2] for MIMO-OFDM systems which employ an identical channel independent order of demodulation for all tones and it was shown that significant complexity reduction over the previous brute-force method could be achieved particularly for large number of tones and small channel orders. [3] modified the interpolation based QR decomposition techniques developed in [2], for a MIMO-OFDM system where each transmitter uses an independent SISO encoder and SIC decoding is employed at the receiver. To improve the performance obtained with the SIC decoder [3] suggested a common ordering where one "common" albeit channel dependent permutation is computed for all data tones prior to interpolation. The common ordering rule suggested in [3] was an extension of the sorted QR rule suggested earlier for the narrow-band MIMO channel. Extensions of the SINR maximizing greedy rule derived originally for the narrowband channel in [4] have also been proposed.

Various prior art techniques for QR decomposition are illustrated. The technique of FIG. 1 determines the QR decompositions (QRDs) of the set of basis tones 10. Using the QRDs of the basis tones, the QRDs of all remaining tones are interpolated and determined 11. This technique offers the lowest complexity for many system configurations, but provides the worst performance due to one fixed (channel-independent) order for all tones 12. In the technique of FIG. 2, the set of a basis tones are used to interpolate and determine the channel responses of all remaining tones 20. The optimal order for each tone is determined 21, and the QRD for each tone corresponding to its optimal order is determined 22. This technique offers optimal performance, but has the highest complexity due to per-tone ordering and QR decomposition 23. The technique of FIG. 3 begins with determining a common order using a set of basis tones 30, determining QRDs of the set of basis tones corresponding to the common order 31. Then, using the QRDs of the basis tones, interpolating and determining QRDs of all remaining tones 32. This technique has complexity and performance that are between the techniques diagramed in FIG. 1 and FIG. 2 33. The technique of FIG. 4 uses a set of basis tones to interpolate and determine the channel responses of all remaining tones 40, and then determines the QRD for each tone 41. This technique offers the same performance as the technique of FIG. 1, and for some system configurations it has the lowest complexity 42.

As noted above, the common ordering rule can result in good performance gains and is the best that can be done with the SIC decoder. The post-decoding feedback stage in the SIC decoder does not allow for per-tone ordering rules. On the other hand the D-SMC demodulator based receiver has no such restriction and in fact benefits more from (finer) per-tone based ordering. However, interpolation based QR decomposition algorithms do not provide any complexity reductions (in-fact can increase the complexity!) when per-tone ordering is employed. Thus there is a tradeoff involved since finer ordering (per-tone as opposed to common) results in better performance but at higher processing complexity (separate QR decomposition for each tone as opposed to interpolation based method).

Accordingly, there is a need for a method which resolves the tradeoff of the above known techniques, using per-chunk ordering and corresponding interpolation based QR decomposition (I-QRD) processes.

SUMMARY OF THE INVENTION

In accordance with the invention, a method includes determining one of a number of tones per chunk and number of chunks responsive to a sub-band bandwidth and a coherence bandwidth; determining an order for each chunk; and determining, for each chunk, QR decompositions for all tones according responsive to the determined order.

In another aspect of the invention, a method includes determining a number of tones per chunk required to find a pre-chunk order responsive to at least one of sub-band bandwidth and coherence bandwidth and number of chunks; determining an order for each chunk using representative tones in that chunk; computing, for each chunk, QR decompositions for all basis tones responsive to the determined order; and interpolating and determining QR decompositions for remaining tones for each chunk using QR decompositions of said the tones. In a preferred embodiment, for each chunk using the QR decompositions of the basis tones, the QRDs for the remaining tones are interpolated and determined.

In a yet further aspect of the invention, a method includes using a set of basis tones to interpolate and determine channel responses of remaining tones; determining the ideal number of responsive to at least one of sub-band bandwidth and coherence bandwidth; determining an order for each said chunk using any one representative tone in respective that chunk; and computing, for each chunk, QR decompositions for all tones responsive to the determined order.

BRIEF DESCRIPTION OF DRAWINGS

These and other advantages of the invention will be apparent to those of ordinary skill in the art by reference to the following detailed description and the accompanying drawings.

FIG. 1 is a flow diagram of determining QR decomposition of only a few tones and remaining QR decompositions via interpolation, according to the prior art.

FIG. 2 is a flow diagram of determining QR decomposition for each tone corresponding to its optimal order, according to the prior art.

FIG. 3 is a flow diagram of determining QR decompositions for a few tones based on a common ordering rule and remaining QR decompositions via interpolation, according to the prior art.

DETAILED DESCRIPTION

The inventive technique determines the optimal number of chunks in each sub-band based on the channel coherence bandwidth, the bandwidth of the allocated resource blocks (or sub-bands) and the given complexity constraints. Ordering rules are provided which determine an optimal order for each chunk and capture most of the gain provided by per-tone ordering while allowing employment of interpolation based QR decomposition. A process to determine QR decompositions via interpolation in a system employing per-chunk ordering is also provided.

The inventive aspect of per-chunk ordering (which includes determining the optimal number of chunks followed by an optimal order for each chunk) is novel and cannot be inferred or derived from either the common ordering of [2] or the fixed ordering of [1] or other prior art. Once the optimal number of chunks along with the order for each chunk is decided, it is possible to extend the interpolation based algorithms of [1] in a straight-forward manner. The invention also provides an efficient interpolation based QR decomposition process which has a lower average complexity than that of the straight-forward extension of the best algorithm of [1] and the prior art.

The frequency selective MIMO channel is converted into a set of N parallel narrowband channels via OFDM. Let $M_r$ and $M_t$ denote the number of receive and transmit antennas. Then the channel model at the $j^{th}$ tone can be written as $$y_j = H_j x_j + v_j$$

where $H_j$ is the $M_r \times M_t$ channel response matrix for the $j^{th}$ tone. In order to use the basic D-SMC demodulator we need to determine the QR decomposition $H_j = Q_j R_j$ for each tone.

Also to use the D-SMC demodulator with MMSE pre-processing we need to determine $Q_{j,l}$ and $R_j$, where $[H_j; I] = Q_j R_j$ is the QR decomposition of the augmented channel matrix and $Q_{j,l}$ is the matrix formed by the first $M_r$ rows of $Q_j$. For brevity, this part of the application only discusses the D-SMC without MMSE pre-processing. All the following steps apply directly to the case with MMSE-preprocessing after simply replacing $H_j$ with the augmented matrix $[H_j; I]$.

Figure 5:
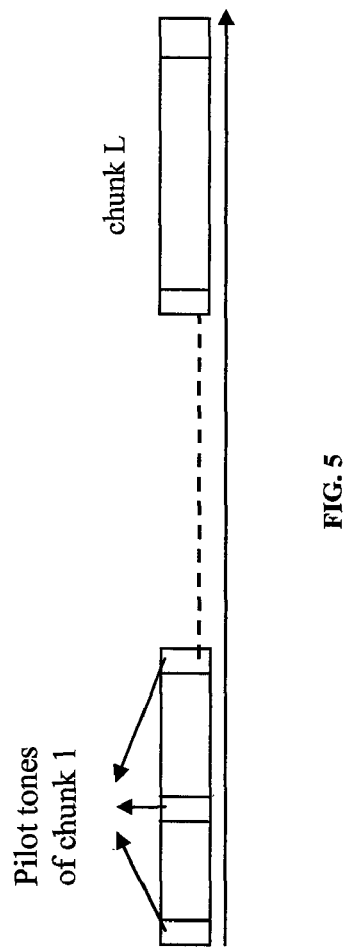
FIG. 5 is a block diagram depicting partition of a sub-band into multiple chunks, in accordance with the invention.
Figure 4:
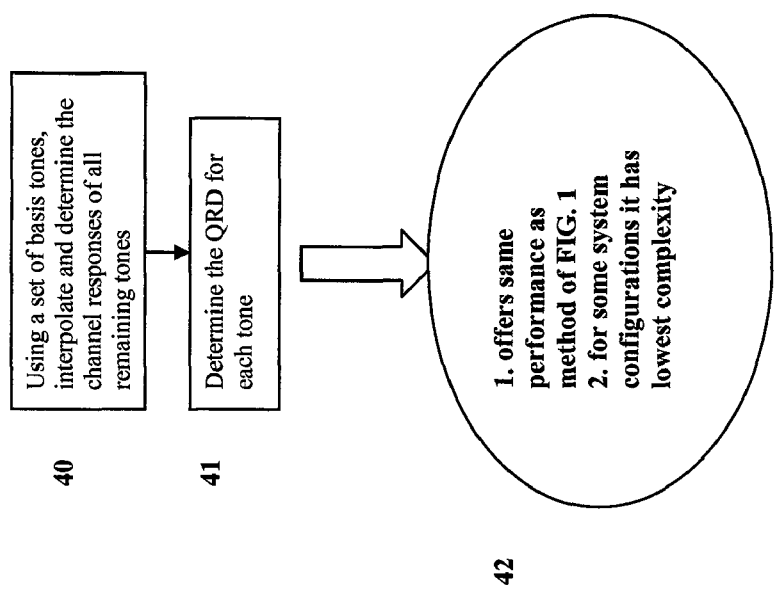
FIG. 4 is a flow diagram of determining the channel matrix for each tone from an interpolation of the basis tones followed by its QR decomposition, according to the prior art.

The performance of D-SMC can be improved if per-tone ordering is employed. Here for the $j^{th}$ tone the QR decomposition is computed for $H_j P_j$, where $P_j$ is a permutation matrix that is optimized separately for the $j^{th}$ tone. In a system employing sub-band scheduling, resources are allocated to a scheduled user in the form of multiple sub-bands, each being a set of adjacent tones. In each sub-band a few tones are designated as pilot tones and known pilot symbols are transmitted over these tones for channel estimation. We now describe our per-chunk ordering rule. First, for each sub-band we determine the ideal number of chunks, denoted by $L_{ideal}$, as equal to the ratio of the sub-band bandwidth and the coherence bandwidth of the underlying channel which in turn can be determined from its estimated delay spread. Then using the procedure described below, the optimal number of chunks per sub-band (denoted by L) is determined and an optimal permutation is chosen per chunk. To illustrate, in FIG. 5 a sub-band is partitioned into multiple ($L \geq 1$) chunks, each comprising of a smaller set of adjacent tones. Thus the QR decompositions for the $q^{th}$ chunk have to be computed for $H_j P^q$ where $P^q$ is fixed across all tones in the $q^{th}$ chunk. The underlying motivation is that the channel matrices within a chunk are highly correlated and one order would be near-optimal for all tones in that chunk.

To choose L we note that the computational complexity (of ordering as well as interpolation) increases with the number of chunks. The complexity incurred over each sub-band for any choice of the number of chunks can be determined for instance from the analytical expressions we have derived. Then for given complexity-constraints the optimal number of chunks per-sub-band is defined to the minimum of the ideal number of chunks and the largest number of chunks satisfying the given constraints.

Next, to determine the permutation for each chunk we propose column-norm based ordering, where the order selected is the non-increasing order of the powers received from the transmitters over the either representative tone(s) (example: the center tone) or over all the pilot tones in the chunk. In other words, the transmitter which is deemed to correspond to the highest received power is the first (or root) node in the decision tree of the D-SMC demodulator, the one with the second highest power is the second node and so on. In case the centre tone is employed for ordering and it is not a pilot tone, its channel response can determined via interpolation from the estimates available from the pilot tones. The total number of tones (either representative or pilots) that are used to determine all the orders over the sub-band is fixed at $L_{ideal}$, irrespective of the chosen number of chunks L.

Next, the following steps summarize the basic version of the inventive interpolation based QR decomposition algorithm for per-chunk ordering. The channel matrices of the pilot tones are estimated and the optimal number of chunks is determined. Then for each chunk: i) interpolate and determine channel responses of the representative tones if the available pilot tones are insufficient, ii) determine the optimal order (or permutation), iii) obtain the QR decompositions of all representative and pilot tones corresponding the order determined, iv) using the QR decompositions of step iii), interpolate and determine the QR decompositions of all data tones in the chunk.

The basic version captures the essence of the idea which is to compute the QR decompositions of all the data tones in a chunk via interpolation instead of the brute-force direct decomposition which involves determining the channel matrix of each tone first and then its QR decomposition. We have improved this basic version considerably by avoiding redundant computations while determining the L*N sets of QR decompositions of the (representative and) pilot channels (one for each chunk in a system with L chunks/sub-band and N sub-bands) and by exploiting interpolation even in computing the QR decompositions of the (representative and) pilot channels for each chunk.

The invention allows obtaining considerable complexity reductions over the existing brute-force methods with negligible performance degradation. With the inventive aspect of per-chunk ordering, the number of chunks is a design parameter. Also provided is a way to determine the ideal number of chunks such that increasing the number of chunks beyond it provides no performance improvements. A method to determine the optimal number of chunks for given complexity constraints is also provided. Methods to determine an optimal permutation for each chunk as well efficient interpolation-based QR decomposition algorithms are also disclosed.

| # of antennas and tones | | | | |
|---|---|---|---|---|
| 2 × 2 500 | 2 × 2 1000 | 4 × 4 500 | 4 × 4 1000 | # of chunks |
| .37 | .36 | .19 | .17 | 1 |
| .43 | .38 | .30 | .23 | 6 |

In the above table are provided the worst-case complexity of the inventive process as a fraction of the average complexity of the corresponding brute-force method (of identical performance) for several MIMO configurations. The ideal number of chunks in the allocated sub-band as well as the number of paths were taken to be 6. In the table, the first and the second rows correspond to 1 and 6 chunks, respectively. The column label (4×4; 500) means a MIMO system with 4 receive and 4 transmit antennas and 500 data tones and so on.

Figures 6, 7:
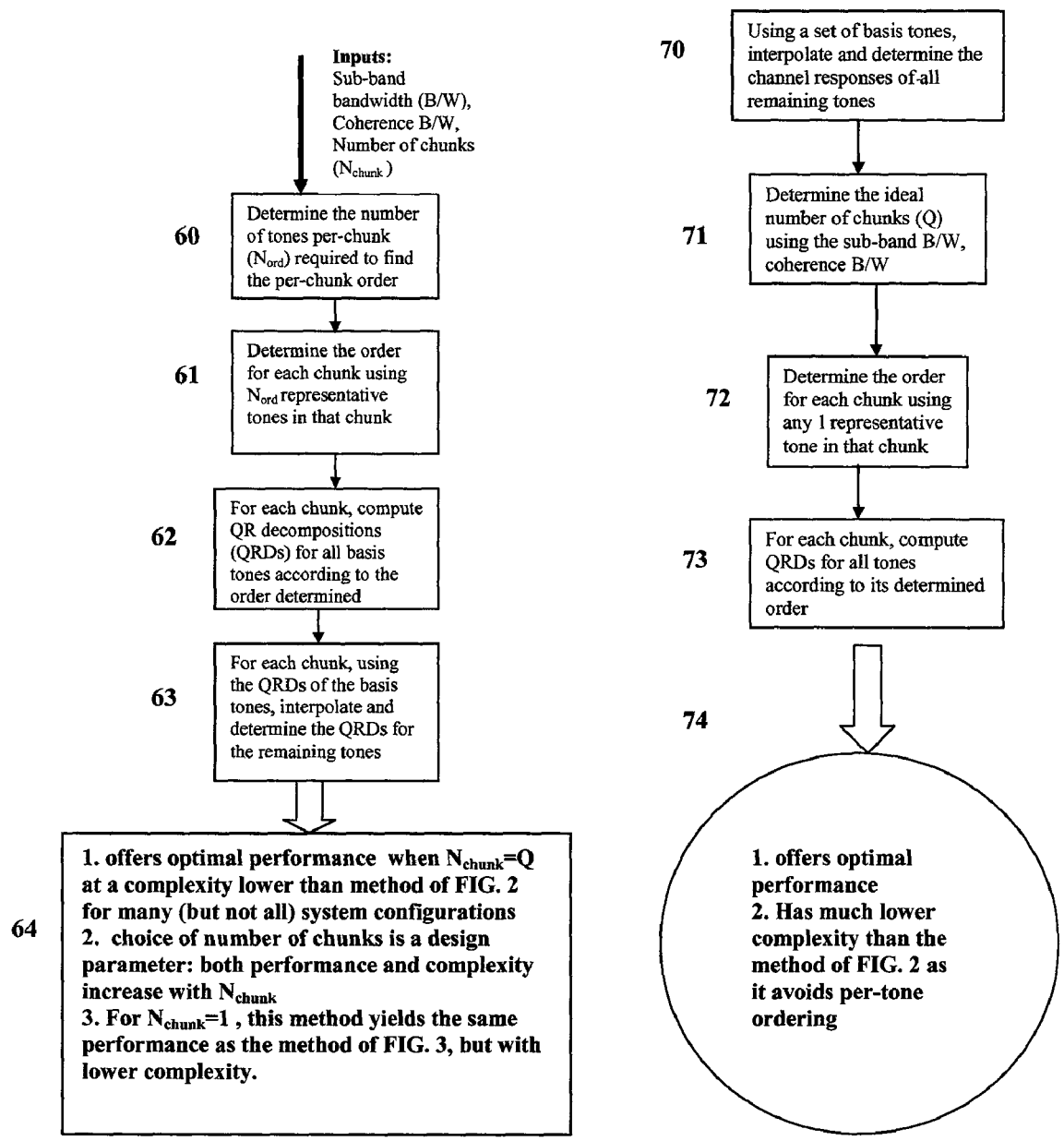
FIG. 6 is a flow diagram of per chunk ordering and interpolation based QR decomposition, in accordance with the invention.
FIG. 7 is a flow diagram of an alternative method for per chunk ordering and QR decomposition, in accordance with the invention.

Turning now to FIG. 6, there is shown a flow diagram of an exemplary method for per chunk ordering and interpolation based QR decomposition, in accordance with the invention. In response to inputs of sub-band bandwidth, coherence bandwidth and number of chunks ($N_{chunks}$), the first step 60 is to determine the number of tones per-chunk ($N_{ord}$) required to find a per-chunk order. Then the order for each chunk using ($N_{ord}$) representative tones in that chunk is determined 61. For each chunk, there are computed QR decompositions for all basis tones according to the order determined 62. For each chunk, using the QR decompositions QRDs of the basis tones, the inventive method interpolates and determines QR decompositions for remaining tones 63. This method offers optimal performance when $N_{chunk}=Q$, where $Q=L_{ideal}$ is the ideal number of chunks in the sub-band, at a complexity lower than the alternative inventive method for many (but not all) system configurations. The choice of number of chunks is a design parameter: both performance and complexity increase with $N_{chunk}$. For $N_{chunk}=1$, this embodiment of the inventive method yields the same performance as the prior art method shown in FIG. 3 of prior art, but with a lower complexity 64.

Shown in FIG. 7 is an alternative embodiment for practicing the invention. Using a set of basis tones, the first step is to interpolate and determine the channel response of all remaining tones 70. Then comes determination of the ideal number of chunks (Q) using the sub-band bandwidth and coherence bandwidth 71. Then the order for each chunk using any one 1 representative tone in that chunk is determined 72. For each chunk, the QR decompositions for all tones according to its determined order are computed 73. This alternative method for practicing the invention offers optimal performance and it has a much lower complexity than the prior art method of FIG. 2 as it avoids per tone ordering.

Detailed Analysis

Turning now to consider some known results and define some notations that will be subsequently used. Let H=QR being the QR decomposition of a $M_r \times M_t$ matrix H of rank $M_t$. Define $$\Delta = diag\left\{r_{11}, r_{11}^2 r_{22}, \cdots, \left(\prod_{i=1}^{M_t-1} r_{ii}^2\right) r_{M_t M_t}\right\} \quad (1)$$

Set $\tilde{Q}=Q\Delta$ and $\tilde{R}=\Delta R$ and let $\tilde{q}_i, (\tilde{r}_i)^T$ denote the $i^{th}$ column and $i^{th}$ row of $\tilde{Q}$ and R, respectively. Then if $\tilde{H}(L,0)$, i.e., H is a Laurent polynomial matrix of degree L, it has been shown in [2] that $$\tilde{q}_i \sim (iL,(i-1)L) \text{ \& } \tilde{r}_i \sim (iL,iL), 1 \leq i \leq M_t. \quad (2)$$

In the case when no MMSE processing is used, H represents the channel matrix of any data or pilot tone. In particular on the $j^{th}$ tone we have that $$H_j = \sum_{l=0}^{L} \tilde{H}_l \exp(-i2\pi jl/N)$$

where N represents the total number of tones and $\{\tilde{H}_l\}$ are the time-domain multi-path channel responses. It is clear that $$(\exp(i\theta)) = \sum_{l=0}^{L} \tilde{H}_l \exp(-i\theta l) \quad (3)$$

is a LP matrix of degree L and $H_j=H(\exp(i\theta))|_{\theta=2\pi j/N}$. Since the QR decomposition of the channel matrix $H_j$ of each data tone is required, the result in (2) can be directly used. On the other hand when MMSE pre-processing is employed, for each data tone we need $R_j$ and $Q_{j,I}$ where $[H_j^T, I]^T = Q_j R_j$ represents the QR decomposition of the augmented matrix $[H_j^T, I]^T$ and $Q_{j,I}$ denotes the matrix formed by the first $M_r$ rows of $Q_j$. Consider the matrix $$\tilde{H}(\exp(i\theta)) = [\tilde{H}_0^T, I]^T + \sum_{l=1}^{L} [\tilde{H}_l^T, 0]^T \exp(-i\theta l). \quad (4)$$

It can be seen that since $\tilde{H}(\exp(i\theta))$ is also an LP matrix of degree L, the result in (2) can be directly used.

Per-Chunk Ordering

Let D be the set of allocated data channels. The allocated data tones can consist of adjacent tones as in localized allocation or it can consist of widely spaced tones as in distributed allocation. Define the sub-band S to be a contiguous set of tones such that the bandwidth of S, denoted by $BW_S$, is equal to the bandwidth of D, denoted by $BW_D$. Let P be the set of representative or pilot tones. The channel matrices corresponding to the tones in P are either interpolated or estimated and for our purposes in the latter case we assume perfect estimation. The objective is to obtain the QR decomposition of the channel matrix (or the augmented channel matrix) of each tone in D. One way to do this, referred to here as the brute-force method, is to interpolate and determine each $H_j$, j ∈ D using the channel matrices from P (recall that this can be done since (3) and (4) are LP matrices) and then do its QR decomposition. This method generally results in the highest complexity but an advantage is that we can do per-tone ordering. In particular after computing $H_j$ we can select any permutation matrix $P_j$ and then compute $H_j P_j = Q_j R_j$. The methods suggested in [2,3] involve computing the QR decompositions of only the channel matrices of the pilot tones and obtaining the Q and R matrices for each of the data tones using interpolation. Although substantial computational savings can be accrued through these methods, a drawback is that we can at-best employ one common ordering or permutation i.e. we need to fix a common permutation P (which can be channel dependent) across all the tones before interpolation.

We now propose two column-norm based common ordering rules. In the first method using the available channels in P (assuming absolute value of P≧L+1) obtain the time-domain multi-path channels $\{\tilde{H}_l\}_{l=0}^{L}$ via interpolation. Then with $\tilde{H}_l = [\tilde{h}_{l,1}, \ldots, \tilde{h}_{l,M_t}]$, the column-norm based ordering is simply the non-increasing order of $$\left\{ \sum_{l=0}^{L} \|\tilde{h}_{l,j}\|^2 \right\}_{j=1}^{M_t}.$$

In other words in each tone, transmitter which is deemed to correspond to the highest received power (over all tones) is the first (or root) node in the decision tree of the D-SMC demodulator, the one with the second highest power is the second node and so on. The motivation for defining this rule comes from the observation that the total power received from transmitter j is equal to $$\sum_{l=0}^{L} \|\tilde{h}_{l,j}\|^2.$$

Note that the ordering determined in this case is independent of the sub-band S.

The other column-norm based ordering is the non-increasing order of $\{\sum_{i \in P \cap \Omega} \|h_{i,j}\|^2\}_{j=1}^{M_t}$, where $h_{i,j}$ denotes the $j^{th}$ column of $H_i$. This rule avoids the interpolation step and determines the order based on the power received from each antenna over all the tones in P∩S.

Next, we introduce an inventive aspect per-chunk ordering rule. As mentioned earlier, since the D-SMC demodulator allows us to perform ordering on a per-tone basis, the performance of any proposed ordering rule should be compared to the optimal per-tone ordering performance. In OFDM systems, we see that the channel matrices in any sufficiently small set of set of consecutive tones are highly correlated and hence intuitively one would expect that one common ordering or permutation would be near-optimal for all the tones in that set. This simple observation forms the basis of our per-chunk ordering rule where we propose to divide the allocated sub-band S into Q non-overlapping chunks, $C_1, \ldots, C_Q$, with each chunk being a smaller contiguous set of tones and Q being the specified input to the algorithm. Over the $j^{th}$ chunk a common (albeit channel dependent) permutation $P^j$ is used for all tones. To complete the description of our algorithm we need to describe a way to obtain the permutation $P^j, 1 \leq j \leq Q$ for each chunk. To do so, we let $BW_{cj}$ denote the band-width of the $j^{th}$ chunk and let $BW_{coh}$ denote the coherence bandwidth[2] of the channel. Then let $R_j \subseteq C_j \cap P$ denote any set of sufficiently dispersed tones in $_j$ such that $$|R_j| = \left\lceil \frac{BW_{C_j}}{BW_{coh}} \right\rceil. \tag{5}$$

A good permutation $P^j$ can be determined as the non-increasing order of $$\left\{ \sum_{l \in R_j} \|h_{l,q}\|^2 \right\}_{q=1}^{M_t}.$$

Note that we have assumed that such a set $R_j$ exists. Otherwise we can interpolate the channel responses of the required number of tones.

Next, we comment on the ideal number of chunks. The ideal number of tones is defined as $$\left\lceil \frac{BW}{BW_{coh}} \right\rceil,$$

where $BW_S$ denotes the band-width of the allocated sub-band. Note that over an L+1 path channel the ideal number of chunks is no greater than L+1. For the baseline system where each channel matrix is estimated prior to its QR decomposition, we recommend per-chunk ordering with the ideal number of chunks.

Pre-Chunk Ordering and I-QRD

Another aspect of the invention uses per-chunk ordering and leverages inter-polation based QR decomposition (I-QRD) methods for each chunk to compute the QR decompositions of the channel matrices corresponding to the data tones in it.

To describe the problem we introduce some notation. Let $B_1 \subset B_2 \ldots \subset B_{M_t} \subseteq P$ be telescoping sets of tones in P such that $|B_i|=2iL+1$. Let S be divided into Q non-overlapping chunks $C_1, \ldots, C_Q$. Let $P^1, \ldots, P^Q$ be Q permutations or orderings corresponding to the Q chunks, respectively. The perimutation $P^j$ for the $j^{th}$ chunk for instance can be determined by using only some of the pilot and representative tones in $C_j$, as described in the previous section. Before we provide our algorithm, we list a few linear algebra facts that are needed. Consider any two one-to-one matrices $H_1$ and $H_2$ with $H_1 = Q_1 R_1$ and $H_2 = Q_2 R_2$ being their QR decompositions. Let $h_{k,i}$, k=1,2, denote the $i^{th}$ column of $H_k$ and let $q_{k,i}(r_{k,i})^T$ denote the $i^{th}$ column and $i^{th}$ row of $Q_k$ and $R_k$, respectively. Then suppose that for some i, $h_{1,i}=h_{2,i}$ and that the first i−1 columns of $H_1$ and $H_2$, denoted by $H_1(:,1:i-1)$ and $H_2(:,1:i-1)$, respectively, are identical upto a permutation i.e. $H_1(:,1:i-1)=H_2(:,1:i-1)$ for some permutation matrix P. For notational convenience this case will be described as $H_1(:,1:i-1) \square H_2(:,1:i-1)$. Then $$q_{1,i}=q_{2,i}, \tilde{q}_{1,i}=\tilde{q}_{2,i}$$

$$r_{1,i} \doteq r_{2,i}, \tilde{r}_{2,i} \doteq \tilde{r}_{2,i},$$

$$r_{1,i}(i)=r_{2,i}(i), \tilde{r}_{1,i}(i)=\tilde{r}_{1,i}(i) \forall i \qquad (6)$$

We are now ready to provide our algorithms. The first algorithm requires more computations but allows for a more parallel structure.

Algorithm 1: Initialize: $\tilde{H}_j^q = H_j P^q$, $\forall j \in B_{M_t}$, q=1,Q.
Loop q=1 to Q
  1. Obtain QR decompositions $H_j^q = Q_j^q R_j^q$, $\forall j \in B_{M_t}$
  2. Obtain $Q_j^q = Q_j^q \Delta_j^q$ and $\tilde{R}_j^q = \Delta_j^q$ for all $j \in B_{M_t}$.
  3. Interpolate and obtain $\{\tilde{Q}_j^q, \tilde{R}_j^q\}_{j \in C_q \cap D}$.
  4. Obtain $Q_j^q = \tilde{Q}_j^q (\Delta_j^q)^{-1}$ and $R_j^q = (\Delta_j^q)^{-1} \tilde{R}_j^q$ for all $j \in C_q \cap D$.

Next we present a computationally more efficient algorithm.
Algorithm 2: Initialize: $H_j^q = H_j P^q$, $\delta_j^q = 1$, $\forall j \in B_{M_t}$, q=1,..., Q and $B_0 = \phi$.

---

Loop i = 1 to $M_t$
  1. Set $Done_q = 0$, $1 \le q \le Q$.
  2. Loop q = 1 to Q
    (a) If $Done_q = 0$
      i. Compute $$q_{j,i}^q = \frac{\tilde{h}_{j,i}^q}{\|\tilde{h}_{j,i}^q\|} \ \& \ (r_{j,i}^q)^T = (q_{j,i}^q)^T \tilde{H}_j^q, \ \forall \ j \in B_i \qquad (7)$$

ii. Apply mapping:

$$(\tilde{q}_{j,i}^q, \tilde{r}_{j,i}^q) = M(q_{j,i}^q, r_{j,i}^q), \ \forall \ j \in B_i,$$
$$= (r_{j,i}^q(i) \delta_j^q q_{j,i}^q, r_{j,i}^q(i) \delta_j^q r_{j,i}^q)$$

Update $\delta_j^q = \delta_j^q (r_{j,i}^q(i))^2$.

iii. Interpolate and determine
$\{\tilde{q}_{j,i}^q, \tilde{r}_{j,i}^q\}_{j \in B_{M_t} \setminus B_i}$ using $\{\tilde{q}_{j,i}^q, \tilde{r}_{j,i}^q\}_{j \in B_i}$.

iv. If $i < M_t$ apply demapping to obtain
$\{q_{j,i}^q, r_{j,i}^q\}_{j \in B_{M_t} \setminus B_i}$.

v. Loop p = q + 1 to Q
        A. If $P^p(:, 1:i-1) \doteq P^q(:, 1:i-1) \ \& \ P^p(:, i) = P^q(:, i)$, then $Done_p = 1$ $$q_{j,i}^p = q_{j,i}^q, \tilde{q}_{j,i}^p = \tilde{q}_{j,i}^q \qquad (8)$$

$$r_{j,i}^p \doteq r_{j,i}^q, \tilde{r}_{j,i}^p \doteq \tilde{r}_{j,i}^q \qquad (9)$$

$$r_{j,i}^p(i) = r_{j,i}^q(i), \tilde{r}_{j,i}^p(i) = \tilde{r}_{j,i}^q(i) \ \forall j \in B_{M_t}, \ i < M_t \qquad (10)$$
and
$$\tilde{q}_{j,i}^p = \tilde{q}_{j,i}^q \qquad (11)$$
$$\tilde{r}_{j,i}^p \doteq \tilde{r}_{j,i}^q \qquad (12)$$
$$\tilde{r}_{j,i}^p(i) = \tilde{r}_{j,i}^q(i), \ \forall j \in B_{M_t}, \ i = M_t. \qquad (13)$$

(b) If $i < M_t$, compute $$\tilde{H}_j^q = \tilde{H}_j^q - q_{j,i}^q (r_{j,i}^q)^T, \forall j \in B_{M_t} \qquad (14)$$

(c) Interpolate and determine $\{\tilde{r}_{j,i}^q\}_{j \in C_q \cap D}$ and the first $M_r$ rows of $\{\tilde{q}_{j,i}^q\}_{j \in C_q \cap D}$ using $\{\tilde{r}_{j,i}^q\}_{j \in B_i}$ and $\{\tilde{q}_{j,i}^q\}_{j \in B_i}$, respectively. Apply demapping to obtain $\{r_{j,i}^q\}_{j \in C_q \cap D}$ and the first $M_r$ rows of $\{q_{j,i}^q\}_{j \in C_q \cap D}$.

A more efficient version of Algorithm 2 is also possible using the following idea. For each $i \in \{1, \ldots, M_t\}$ we can partition the set $\{1 \ldots, Q\}$ into at-most Q non-empty sets $\{S_{i,k}\}_{k=1}^{m_i}$, where $m_i \le Q$, such that for any $p,q \in \{1, \ldots, Q\}$ and $1 \le k \le m_i$ $$p,q \in S_{i,k} \Rightarrow P^p(:,1:i-1) \doteq P^q(:,1:i-1) \& P^p(:,i) = P^q(:,i) \qquad (15)$$

and $$P^p(:,1:i-1) \doteq P^q(:,1:i-1) \& P^p(:,i) = P^q(:,i) \Rightarrow \exists k: p,q \in S_{i,k} \qquad (16)$$

Once these sets are determined, at the $i^{th}$ step we need to compute the $i^{th}$ column and row of Q and R, respectively, only for one index in each of the $m_i$ sets. Also, in the case of common ordering we have Q=1 i.e. only one chunk is present and our Algorithms 1 and 2 reduce to algorithms 2 and 3 of [2], respectively.

Our interpolation algorithms work for any given set of chunks and associated per-chunk permutations. To decide on the optimal number of chunks, we have to note the following points. The complexity of the algorithm increases with the number of chunks and can be worse than the corresponding brute-force method if the number of grows beyond a certain point as will be analytically shown in the next section. On the other hand, as seen in the previous section the performance of the D-SMC demodulator improves as the number of chunks increases but the gains become negligible after the number of chunks exceeds the ideal number of chunks. Thus for given complexity-constraints the optimal number of chunks per-sub-band is defined to the minimum of the ideal number of chunks and the largest number of chunks satisfying the given complexity constraints.

Complexity Analysis

In this section we conduct a complexity analysis to demonstrate the computational savings resulting from our algorithms. We consider the case without MMSE preprocessing (referred to as the ZF case) and in this case let $N=M_r$. In the case when MMSE preprocessing is used, recall that the augmented channel matrix per-tone has dimensions $(M_r+M_t) \times M_t$ and we set $N=M_r+M_t$. Following [2], we let $c_{IP}$ denote the cost (in terms of full multiplications) of interpolating a scalar LP. Let $c_{QR}$ denote the cost of QR decomposition and $c_M, c_{M^{-1}}$ denote the costs of mapping and inverse mapping, respectively. It can be verified that $$c_{QR} = 3M_t^2 N/2 + 3N^2 M_t/2 - M_t^3 - M_t^2/2 - N^2/2 - (N+M_t)/2,$$

$$c_M = M_r(M_t-1) + M_t(M_t+1)/2 + M_t - 1, \ c_{M^{-1}} = c_M + M_r - 1.$$

In the following analysis we assume an L+1 path channel and let $N_p = 2LM_t + 1$ denote the number of representative tones which are contained in the set of data tones so that QR decompositions must be determined for these also. These representative tones are used to determine the ordering and also for interpolation in the I-QRD algorithms. The channel matrices of these representative tones are determined through interpolation using a set of estimated pilot channels. Let Q denote the ideal number of chunks and note that when we have one chunk, Q is also the number of representative tones needed to determine the common ordering. Then, we have that $$c_{BF-fixed} = D(M_t M_r c_{IP} + c_{QR}),$$

$$c_{BF-per-tone} = D(M_t M_r c_{IP} + c_{QR} + M_t M_r),$$

$$c_{BF-common} = D(M_tM_rc_{IP}+c_{QR})+QM_tM_r,$$

$$c_{BF-Q\ chunk} = D(M_tM_rc_{IP}+c_{QR})+QM_tM_r,$$

$$c_{Alg1-common} = (D-N_p)(c_M{-}1+(M_rM_t+M_t(M_t+1)/2)c_{IP})+ \\ N_p(M_tM_rc_{IP}+c_{QR}+c_m)+QM_tM_r,$$

$$c_{Alg1-Qchunk} = c_{Alg1-common}+(Q-1)N_p(c_{QR}+c_M),$$

where $c_{BF-fixed}$, $c_{BF-per-tone}$ and $c_{BF-common}$ denote the complexities of the baseline brute-force method with a fixed (channel-independent) order, the baseline brute-force method with per-tone ordering and baseline brute-force method with common ordering (determined from Q representative tones), respectively. $c_{BF-Qchunk}$, $c_{Alg1-common}$ and $c_{Alg1-Qchunk}$ denote the complexities of the baseline brute-force method using per-chunk ordering with (ideal number) Q chunks, the first I-QRD algorithm with common ordering (determined from Q representative tones) and the first I-QRD algorithm with Q chunks, respectively.

For the second algorithm, since the complexity is channel dependent, we provide the worst-case complexity where again for complexity computations we count the number of multiplications. Then, we first obtain $$E = \sum_{q=2}^{M_t-1} \left\{ \begin{array}{l} (2qL+1)((M_t-q+1)(N+1)+2N)+ \\ 2L(M_t-q)((N+M_t-q+1)(c_{IP}+1)) \end{array} \right\} +$$

$$2L(M_t-1)((N+M_t)(c_{IP}+1))+(2L+1)(N(M_t+1)+M_t)+$$

$$(2M_tL+1)(2N+M_r+1)+(M_t-1)(2M_tL+1)+$$

$$N(M_t-1)(M_t/2+1)(2M_tL+1).$$

Then, we have that $$c_{Alg2-common} = (D-N_p)(c_M{-}1+(M_rM_t+M_t(M_t+1)/2)c_{IP})+ \\ N_pM_tM_rc_{IP}+E+QM_tM_r,$$

$$c_{Alg2-Qchunk} = c_{Alg2-common}+(Q-1)E,$$

where $c_{Alg2-common}$ and $c_{Alg2-Qchunk}$ denote the complexities the second I-QRD algorithm with common ordering (determined from Q representative tones) and the second I-QRD algorithm with Q chunks, respectively.

In the table below are compared the computational complexities of the inventive method for a 4×4 MIMO system using the OFDM access (512 point DFT) over a 6 path fading channel for different number of data tones. Following [2], we set $c_{IP}=2$. We consider the case with MMSE processing as well as the case without it. In the first row we plot the ratio $$\frac{c_{Alg2-common}}{c_{BF-Qchunk}}$$

and in the second row we plot the ratio $$\frac{c_{Alg2-Qchunk}}{c_{BF-Qchunk}}$$

and in both cases we set Q=6.

| ZF, 200 | ZF, 500 | ZF, 1000 | MMSE, 200 | MMSE, 500 | MMSE, 1000 |
|---|---|---|---|---|---|
| 0.67 | 0.61 | 0.59 | 0.23 | 0.19 | 0.17 |
| 1.51 | 0.95 | 0.76 | 0.65 | 0.36 | 0.26 |

The present invention has been shown and described in what are considered to be the most practical and preferred embodiments. It is anticipated, however, that departures may be made there from and that obvious modifications will be implemented by those skilled in the art. It will be appreciated that those skilled in the art will be able to devise numerous arrangements and variations which, although not explicitly shown or described herein, embody the principles of the invention and are within their spirit and scope.

What is claimed is:

1. A method comprising the steps of:
    determining either the number of tones per chunk required to compute per-chunk order responsive to a sub-band bandwidth, a coherence bandwidth and number of chunks or the number of chunks responsive to a sub-band bandwidth and a coherence bandwidth upon receiving a signal from at least one transmitter;
    determining an order for each chunk; and
    determining for each chunk QR decompositions for a set of tones according to the determined order.

2. The method of claim 1, wherein said step of determining the order for each one of the chunks comprises using representative tones in the respective said chunks.

3. The method of claim 1, wherein the set of tones in said step of determining for each chunk QR decompositions, is the set of basis tones.

4. The method of claim 3, further comprising the step of, for each said chunk, using QR decompositions of the basis tones to interpolate and determine QR decompositions for remaining tones in that chunk.

5. The method of claim 1, wherein said step of determining said number of chunks is preceded by a step of using a set of basis tones to interpolate and determine channel responses for all remaining tones in the sub-band.

6. The method of claim 1, wherein said step of determining said order for each chunk comprises of using any one representative tone in respective said chunk.

7. The method of claim 1, wherein the number of tones required to find the per-chunk order is computed.

8. A method comprising the steps of:
    determining the number of tones per chunk required to find a per-chunk order responsive to at least one of sub-band bandwidth and coherence bandwidth and number of chunks upon receiving a signal from at least one transmitter;
    determining an order for each said chunk using representative tones in that chunk;
    computing, for each said chunk, QR decompositions for all basis tones responsive to the determined order; and
    interpolating and determining QR decompositions for remaining tones of each said chunk using QR decompositions of said basis tones.

9. A method comprising the steps of:
    using a set of basis tones to interpolate and determine channel responses of remaining allocated tones in the sub-band upon receiving a signal from at least one transmitter;

determining the number chunks responsive to at least one of sub-band bandwidth and coherence bandwidth;
determining an order for each said chunk using any one representative tone in respective said chunk;
computing, for each said chunk, QR decompositions for all tones responsive to the determined order.

* * * * *